US006847314B2

United States Patent
Chang

(10) Patent No.: US 6,847,314 B2
(45) Date of Patent: Jan. 25, 2005

(54) METHOD FOR CODING INTEGER SUPPORTING DIVERSE FRAME SIZES AND CODEC IMPLEMENTING THE METHOD

(75) Inventor: Ki-seok Chang, Suwon-si (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 76 days.

(21) Appl. No.: 10/437,978

(22) Filed: May 15, 2003

(65) Prior Publication Data

US 2003/0227975 A1 Dec. 11, 2003

(30) Foreign Application Priority Data

Jun. 5, 2002 (KR) .................................. 10-2002-0031606

(51) Int. Cl.[7] .......................... H03M 7/40; H04J 11/00
(52) U.S. Cl. ........................................ 341/67; 370/210
(58) Field of Search .......................... 341/67; 370/210; 375/240.16, 240.25; 382/233, 246; 386/68; 708/404

(56) References Cited

U.S. PATENT DOCUMENTS

| 5,297,070 | A | | 3/1994 | Hua et al. | |
|---|---|---|---|---|---|
| 5,305,113 | A | * | 4/1994 | Iwamura et al. | ............... 386/68 |
| 5,787,204 | A | * | 7/1998 | Fukuda | ........................ 382/233 |
| 5,841,938 | A | * | 11/1998 | Nitta et al. | .................... 386/68 |
| 6,400,680 | B1 | * | 6/2002 | Fisch | .......................... 370/210 |
| 6,584,154 | B1 | * | 6/2003 | Wu | ......................... 375/240.16 |

* cited by examiner

Primary Examiner—Patrick Wamsley
(74) Attorney, Agent, or Firm—Sughrue Mion, PLLC

(57) ABSTRACT

An integer coding method supporting diverse frame sizes and a coder-decoder (CODEC) implementing the method are provided. Maximum sample values are detected from a plurality of frames having different numbers of samples. The detected maximum sample values are normalized on the basis of a maximum sample value of the largest frame. A maximum sample value is detected from the normalized sample values. Multiples are determined according to the size of each frame on the basis of the detected maximum sample value and a sample value of each frame is multiplied by the multiples to generate an integer code.

7 Claims, 3 Drawing Sheets

METHOD FOR CODING INTEGER SUPPORTING DIVERSE FRAME SIZES AND CODEC IMPLEMENTING THE METHOD

BACKGROUND OF THE INVENTION

This application claims the priority of Korean Patent Application No. 2002-31606, filed Jun. 5, 2002, in the Korean Intellectual Property Office, the disclosure of which is incorporated herein in its entirety by reference.

1. Field of the Invention

The present invention relates to the field of digital signal processing (DSP) system, and more particularly, to an integer coding method supporting diverse frame sizes and a coder-decoder (CODEC) implementing the method.

2. Description of the Related Art

A digital signal processing (DSP) coder-decoder (CODEC) may be used to perform digital signal arithmetic operations in devices which provide multimedia content.

Floating-point operations are used very frequently in DSP algorithms. Also, when DPS algorithms are used to improve speed or are applied to a platform, floating-point operations are transformed into integer operations. Here, integer coding means that a floating-point operation on a CODEC is transformed into a fixed-point operation.

DSP CODECs, used with most forms of multimedia including video and audio, use the characteristics of a frequency region by employing discrete cosine transform (DCT) or discrete Fourier cosine transform (DFT). Here, DCT and DFT use fast Fourier transform (FFT) for high-speed operation. In the algorithm of FFT, multiplication operations are used. Thus, the result of FFT is very sensitive to input parameters during an integer coding operation.

FIG. 1 is a flowchart illustrating a conventional integer coding method employing an inverse discrete Fourier transform (IDFT).

First, samples in units of frames input in the form of a variable length code (VLC) are inversely quantized to generate samples having real number values (110). Subsequently, the inversely quantized samples are multiplied by $2^n$ according to a maximum sample value and an effective bit (120). Here, the maximum sample value is a sample value having the largest absolute value among all sample values. As shown in FIG. 2, an effective bit region 210 is obtained by combing a symbol bit region S, an integer bit region 220, and a decimal bit region 230. And, n is determined by subtracting a maximum value bit from the effective bit region 210.

Subsequently, an IDFT operation is performed on the samples multiplied by $2^n$ (130).

In the conventional integer coding method illustrated in FIG. 1, when frames on which the IDFT operation is performed have different number of samples, a multiple to be multiplied by samples is determined according to the maximum sample value and the effective bit of the largest frame. Also, the multiple is fixedly applied to a frame having fewer samples than the largest frame. Thus, in the conventional integer coding method, when an integer operation of a frame having relatively fewer samples is performed, the decimal bit region 230 is fixed. Thus, the remaining part of the integer bit region 220 cannot be utilized, and accuracy during an integer coding operation is lowered.

SUMMARY OF THE INVENTION

The present invention provides a method for coding an integer, in which samples to be subjected to an inverse discrete Fourier transform (IDFT) are multiplied by different multiples according to the number of samples in a frame such that the accuracy of integer coding is improved.

The present invention also provides a coder-decoder (CODEC) employing an integer coding method.

According to an embodiment of the present invention, there is provided an integer coding method of a digital signal processing (DSP) coder-decoder (CODEC) for coding/decoding an audio and/or video signal. The method comprises detecting maximum sample values from a plurality of frames having different numbers of samples, normalizing the detected maximum sample values on the basis of a maximum sample value of the largest frame, detecting a maximum sample value from the normalized sample values, and determining multiples according to the size of each frame on the basis of the detected maximum sample value and multiplying a sample value of each frame by the multiples to generate an integer code.

According to another embodiment of the present invention, there is provided a coder-decoder (CODEC) for coding/decoding audio and/or video data in units of frames. The CODEC includes an inverse quantization unit to inversely quantize samples in the form of a variable length code (VLC) and generate samples having real number values, an integer coding unit to determine multiples according to the size of a frame on the basis of a maximum sample value and effective bit for samples in units of frames inversely quantized by the inverse quantization unit and multiply the inversely quantized samples in units of frames by the multiples to perform an integer operation of the samples, and an integer inverse transform unit to perform an inverse Fourier transform operation of the samples multiplied by the integer coding unit, into an integer.

BRIEF DESCRIPTION OF THE DRAWINGS

The above and other aspects and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to the accompanying drawings.

Figure 1:
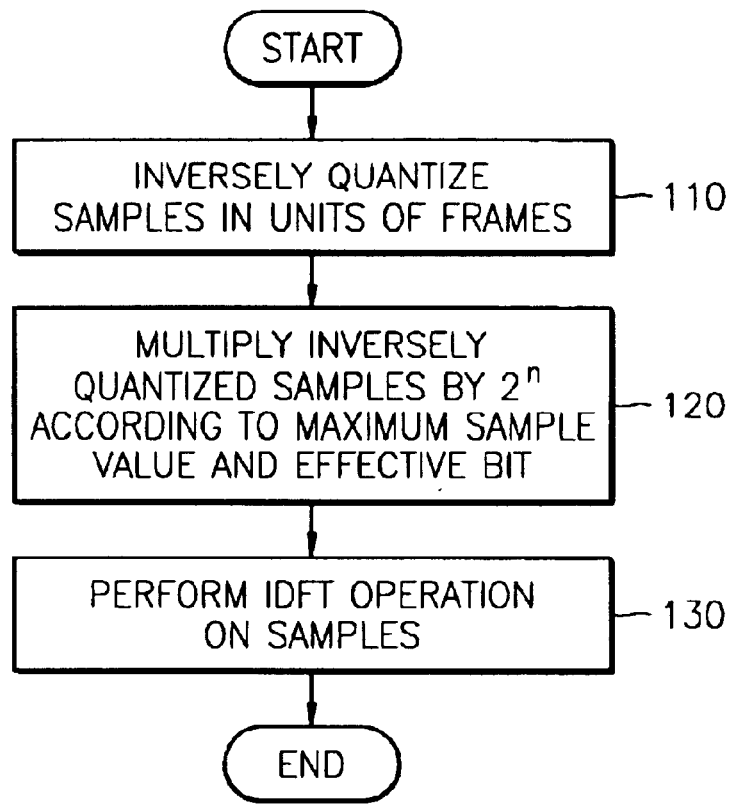
FIG. 1 is a flowchart illustrating a conventional integer coding method.
Figure 2:
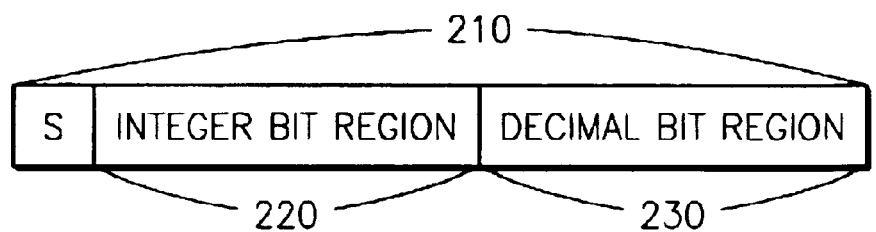
FIG. 2 is a conceptual diagram of a floating-point expression method.
Figure 3:
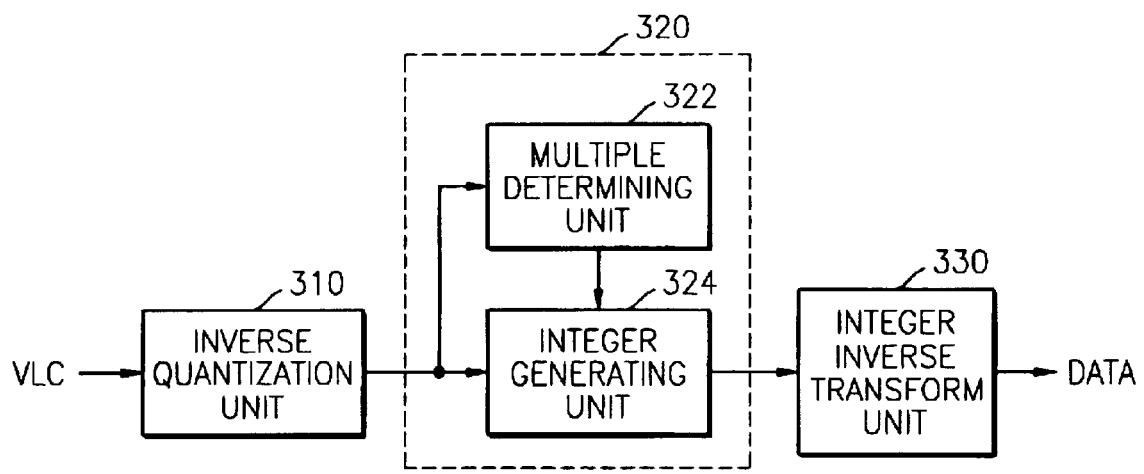
FIG. 3 is a block diagram of an embodiment of a signal decoder employing an integer coding method according to the present invention.

FIG. 3 is a block diagram of an embodiment of a signal decoder employing an integer coding method according to the present invention. Referring to FIG. 3, a transmitting terminal (not shown) compresses a video or audio signal and transmits the video or audio signal in a variable length code (VLC) in units of frames. A frame is comprised of a header in which information regarding the number of samples in the frame is recorded, and data.

An inverse quantization unit 310 inversely quantizes the VLC transmitted from the transmitting terminal to generate samples having real number values.

An integer coding unit 320 includes a multiple determining unit 322 and an integer generating unit 324. That is, the multiple determining unit 322 obtains an effective bit, a maximum sample value, and the size of a frame, using the samples in units of frames inversely quantized by the inverse quantization unit 310 and determines multiples on the basis of the effective bit, a maximum sample value, and the size of a frame. The integer generating unit 324 multiplies the multiples determined by the multiple determining unit 322 by the inversely quantized samples having the real number values to generate integers.

An integer inverse transform unit 330 applies inverse discrete Fourier transform (IDFT) or inverse fast Fourier transform (IFFT) as an embodiment and performs an inverse Fourier transform operation using the integers generated by the integer coding unit 320.

Figure 4:
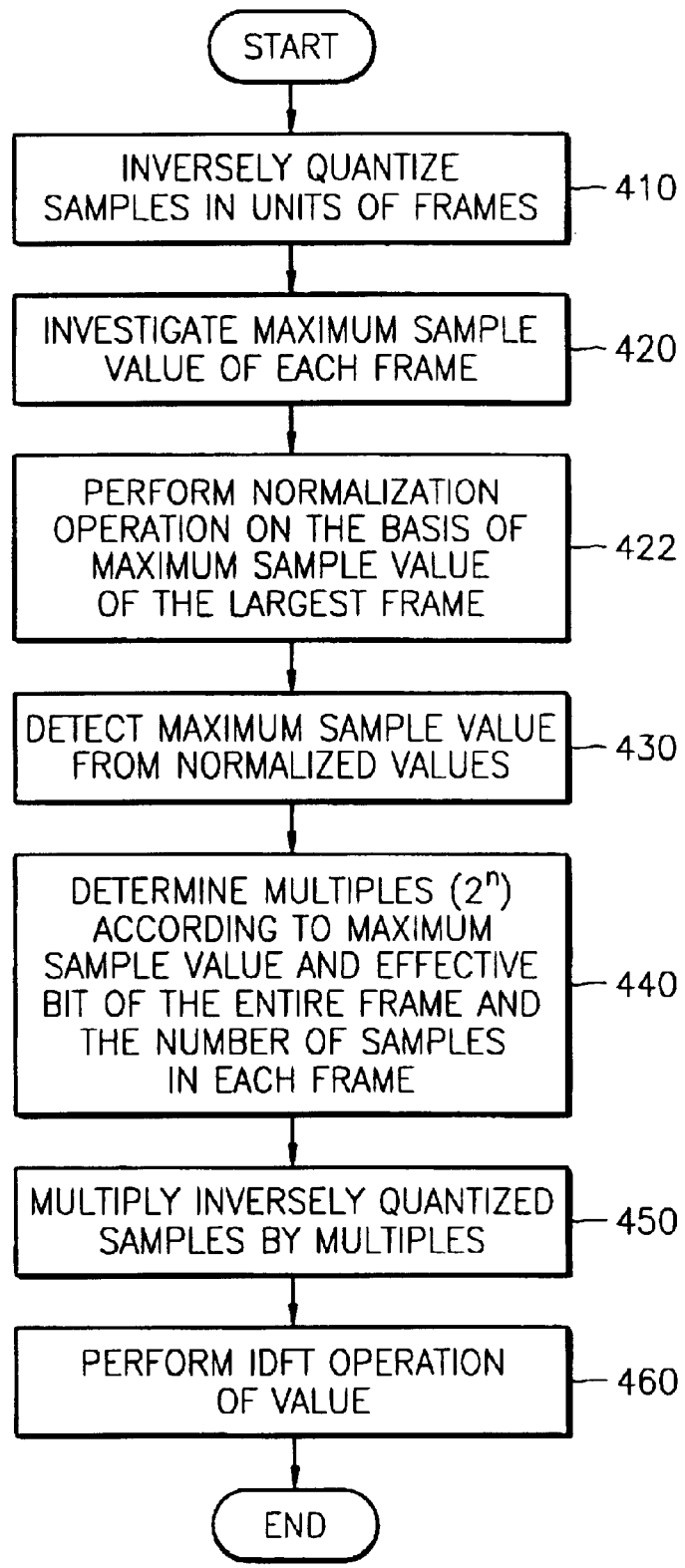
FIG. 4 is a flowchart illustrating an embodiment of the integer coding method according to the present invention.

FIG. 4 is a flowchart illustrating an embodiment of the integer coding method according to the present invention.

First, samples in units of frames input in the form of a VLC are inversely quantized, thereby generating samples having real number values (410).

Subsequently, if the value of the input samples in units of the frames is $2^m$ to $2^n$ (m<n), maximum sample values of each frame recorded in a header for each frame are investigated (420). Here, the input maximum sample values have a close relation to the size of frames. That is, if the size of the frame is 2048 samples and a maximum sample value is m, when the size of the frame is 1024 samples, the maximum sample value is m/2, and when the size of the frame is 512 samples, the maximum sample value is m/4, and when the size of the frame is 256 samples, the maximum sample value is m/8. For example, if "a frame having the number of samples equal to 512", "a frame having the number of samples equal to 1024", "a frame having the number of samples equal to 256", "a frame having the number of samples equal to 1024", "frame having the number of samples equal to 256", and "a frame having the number of samples equal to 1024" are sequentially input, the maximum sample values in each frame may be extracted as "400", "790", "201", "810", "198", and "805", respectively.

Subsequently, a normalization operation is performed on the basis of the maximum sample value of the largest frame among the maximum sample values for each frame (422). For example, in the case of "a frame having the number of samples equal to 1024" among the input frames, the normalized value is 810*1=810, in the case of "a frame having the number of samples equal to 512", the normalized value is 400*2=800, and in the case of "a frame having the number of samples equal to 256", the normalized value is 201*$2^2$=804.

Subsequently, a maximum sample value is detected from the normalized values (430).

If a normalized maximum value is Maxi, the maximum sample value in the entire frame may be obtained by Equation 1 as follows.

$$\text{Max}_{total} = \text{Max}\{\text{Max}_m * 2^{(n-m)}, \text{Max}_{m+1} * 2^{(n-m-1)}, \text{Max}_{m+2} * 2^{(n-m-2)}, \ldots, \text{Max}_n * 2^{(n-n)}\} \quad (1)$$

For example, $\text{Max}_{total}$ among the normalized values 810, 800, and 804, is 810. Subsequently, different multiples are determined according to a maximum sample value and effective bit of the obtained entire frame and the number of samples in each frame (440). If the number of effective bits provided by a platform is $\text{Bit}_{platform}$ and the number of bits of a sign part and an integer part of $\text{Max}_{total}$ are $\text{Bit}_{max}$, when the number of samples is $2^i$, a multiple by which each sample of the frame is finally multiplied, may be obtained by Equation 2 below. Here, the effective bit is obtained by combining a symbol bit, an integer bit, and a decimal bit.

$$Q_i = 2^{\text{Bit}_{platform} - \text{Bit}_{max} + (n-i)} \quad (2)$$

Here, $2^n$ is the number of samples in the largest frame, and $2^i$ is the number of samples in a frame to be calculated at present. Consequently, $\text{Bit}_{platform} - \text{Bit}_{max} + (n-i)$ becomes a decimal region.

For example, multiples of "frames having the number of samples 1024", "frame having the number of samples 512", "frame having the number of samples 256" are obtained by Equation 2.

Subsequently, as described above, the inversely quantized samples are multiplied by multiples determined through a learning step for each frame size (450).

For example, if a frame has the number of samples 2048, a sample is multiplied by $2^5$, and if a frame has the number of samples 1024, a sample is multiplied by $2^6$, and if a frame has the number of samples 512, a sample is multiplied by $2^7$, and if a frame has the number of samples 256, a sample is multiplied by $2^8$. Thus, decimal bit is varied according to the number of samples in an input frame, thereby improving the accuracy of an integer operation.

Lastly, an inverse Fourier transform operation of a value in which samples in a frame is multiplied by $Q_i$, is performed (460).

As described above, according to the present invention, different multiplies are applied according to the size of a frame in a CODEC, such that a decimal bit region is varied and the accuracy of integer coding is improved.

The present invention can be applied to control buffering of a video stream. The present invention is not limited the above-mentioned embodiment, and it will be understood by those skilled in the art that various changes in form and details may be made therein without departing from the spirit and scope of the invention.

What is claimed is:

1. An integer coding method of a digital signal processing (DSP) coder-decoder (CODEC) for coding or decoding an audio or video signal, the method comprising:

detecting maximum sample values from a plurality of frames having different numbers of samples;

normalizing the detected maximum sample values on the basis of a maximum sample value of a largest frame having a greatest number of samples;

detecting a maximum normalized sample value from the normalized sample values; and determining multiples according to a size of each frame on the basis of the detected maximum normalized sample value and multiplying a sample value of each frame by the multiples to generate an integer code.

2. The method of claim 1, wherein the multiples are determined by $$Q_i = 2^{\text{Bit}_{platform} - \text{Bit}_{max} + (n-i)}, \text{ and}$$

where i is an integer, $2^n$ is the number of samples in the largest frame, $2^i$ is the number of samples in a corresponding frame, $\text{Bit}_{platform}$ is the number of effective bits obtained by combining a symbol bit, an integer bit, and a decimal bit, and $\text{Bit}_{max}$ is the number of bits of a sign part and an integer part of the maximum sample value in the entire frame.

3. The method of claim 1, further comprising performing an inverse Fourier transform operation on a sample value multiplied by different multiples according to the number of samples in each frame and transforming the sample value into an integer.

4. The method of claim 1, wherein the determined multiples are applied when an inversely quantized sample value is generated as the integer code.

5. A coder-decoder (CODEC) for coding or decoding audio or video data in units of frames, the CODEC comprising:
   an inverse quantization unit configured to inversely quantize samples in the form of a variable length code (VLC) and generate samples having real number values;
   an integer coding unit configured to determine multiples according to a size of a frame on the basis of a maximum sample value and an effective bit for samples in units of frames inversely quantized by the inverse quantization unit, and multiply the inversely quantized samples in units of frames by the multiples to perform an integer operation of the samples; and
   an integer inverse transform unit configured to perform an inverse Fourier transform operation on the samples multiplied by the integer coding unit to transform the samples into integers.

6. The CODEC of claim 5, wherein the integer coding unit comprises:
   a multiple determining unit configured to obtain the effective bit, a maximum sample value, and the size of a frame, using the samples in units of frames inversely quantized by the inverse quantization unit and determine multiples on the basis of the effective bit, a maximum sample value, and the size of a frame; and
   an integer generating unit configured to generate an integer code by multiplying the samples inversely quantized by the inverse quantization unit by the multiples determined by the multiple determining unit.

7. The CODEC of claim 6, wherein the multiple determining unit determines the multiples according to the equation $$Q_i = 2^{Bit_{platform} - Bit_{max} + (n-i)}, \text{ and}$$

where i is an integer, $2^n$ is the number of samples in the largest frame, $2^i$ is the number of samples in a corresponding frame, $Bit_{platform}$ is the number of effective bits obtained by combining a symbol bit, an integer bit, and a decimal bit, and $Bit_{max}$ is the number of bits of a sign part and an integer part of the maximum sample value in the entire frame.

* * * * *